United States Patent
Low et al.

[15] 3,680,830
[45] Aug. 1, 1972

[54] EVACUATION VALVE

[72] Inventors: George M. Low, Acting Administrator of the National Aeronautics and Space Administration with respect to an invention of; Burton W. Roney, 34 Lakeside Ave., Wayne, N.J. 07470

[22] Filed: Jan. 5, 1971

[21] Appl. No.: 104,047

[52] U.S. Cl. .................................251/86, 251/331
[51] Int. Cl. ..........................................F16k 25/00
[58] Field of Search........257/86, 335, 321, 322, 323, 257/331, 238–246

[56] References Cited

UNITED STATES PATENTS

| | | |
|---|---|---|
| 2,114,139 | 4/1938 | Crosthwait et al.....251/335 B X |
| 2,391,808 | 12/1945 | Vincent...................25/335 B X |
| 2,439,052 | 4/1948 | McIntosh......................251/323 |
| 2,538,133 | 1/1951 | Tratzik .........................251/357 |

FOREIGN PATENTS OR APPLICATIONS 728,849   12/1942   Germany..................251/335 B

*Primary Examiner*—Henry T. Klinksiek
*Attorney*—John R. Maning and Howard J. Osborn

[57] ABSTRACT

A packless valve for use with an evacuation chamber and having a quick reaction, single-throw, open-closed control and a quick-connect adapter for attachment to a vacuum line and a vacuum pump. A bellows connecting the valve head to the valve casing seals off the seating mechanism from any connect with fluid flowing through the valve. The bellows and a spring act to hold the valve head in a seated position. A ball and socket joint connects the valve stem to the valve head. The valve head is free to swivel as it is seated producing an automatic valve alinement and a better valve seal. An O-ring fitted in a groove in the valve head also serves to seal the valve head in the seat. A two-position cam lever moves the valve stem through a self-lubricating bushing to open and close the valve.

1 Claim, 2 Drawing Figures

PATENTED AUG 1 1972

3,680,830

INVENTOR
BURTON W. RONEY

BY
ATTORNEY

EVACUATION VALVE

ORIGIN OF THE INVENTION

The invention described herein was made in the performance of work under a NASA contract and is subject to the provisions of Section 305 of the National Aeronautics and Space Act of 1958, public law 85–568 (72 Stat. 435, 42 USC 2457).

BACKGROUND OF THE INVENTION

This invention relates to a valve and more particularly to a packless, quick reaction valve for use in an evacuation chamber. The prior art provides a selection of valves which are suitable for a number of operations. However, there is no prior art valve which combines high efficiency sealing, quick reaction and low maintenance for use with an evacuation chamber.

The orientation of spacecraft in orbit is quite critical especially to many of the astronomical experiments conducted. Since the discharge from reaction control jets might prove troublesome, platform stability for spacecraft such as project SKYLAB will most probably require the use of gyroscopes. For such an application, the vacuum of space will be used to reduce rotational losses of the gyroscope rotor due to air friction.

However, for ground testing such gyros, an evacuation chamber must surround the gyro rotor to allow operation at lowered pressures thus reducing air friction losses. During gyroscope testing, the pressure in the evacuation chamber was maintained at five microns. It was found that rotor temperatures increased from 95° to 160° F. in less than 5 minutes when chamber pressure was raised to atmospheric during gyro ground testing. Such a temperature gain could prove highly detrimental since the gyroscope lubrication showed signs of molecular breakdown at 180° F. Rotational losses due to the rapid introduction of atmospheric pressure were about 50 percent. A valve for the evacuation chamber was required which combined the features of fast reaction, positive seal and no maintenance with a quick-connect feature allowing rapid reevacuation in the event of a rapid pressure influx. These requirements led to the design of the novel valve described herein.

SUMMARY OF THE INVENTION

The novel valve includes a valve housing having two ports; one port opening into an evacuation chamber and having a tapered cylindrical valve seat and another port consisting of a quick-connect adapter. The tapered, cylindrical valve body is moved into and away from a seated position by a two-position cam lever connected to the valve stem. The valve stem is connected to the valve body by a ball joint permitting the valve body to swivel and aline itself with the valve seat as it is closed. An O-ring fitted into a groove in the valve body helps seal the valve body in a closed position. A bellows attached to the valve body and the casing seals off the valve stem and other seating apparatus from the fluid flowing through the valve. The bellows and a spring inside the bellows apply pressure to hold the valve body closed. A permanently attached vacuum line would interfere with the gimbal assembly of the gyroscope. Therefore, a vacuum line may be removably attached to the quick-connect adapter to reevacuate the chamber.

It is an object of the present invention to provide a valve for an evacuation chamber having excellent sealing characteristics combined with rapid reaction characteristics, transitioning from the fully opened to the fully closed position and back with a very simple manipulation. Another object of the present invention is to provide a detachable connection for an evacuation line in an application where permanently attached lines would be impractical. It is yet a further object of the present invention to provide a valve which is simply designed, simply operated and maintenance-free.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DESCRIPTION OF THE PREFERRED EMBODIMENT

Figure 1:
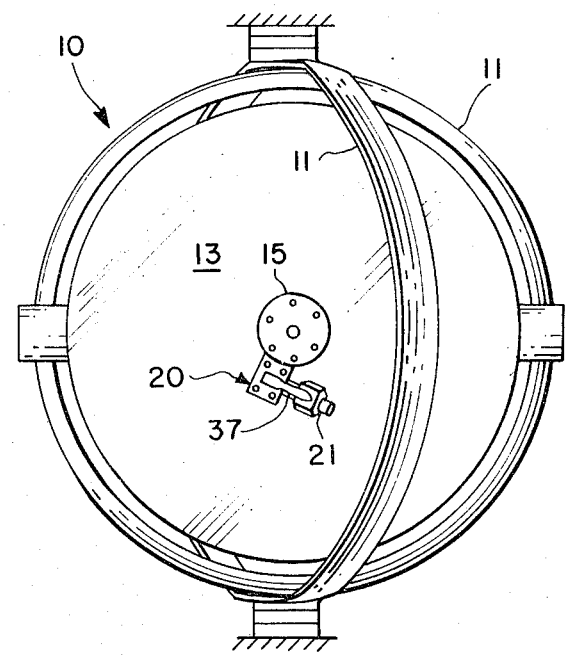
FIG. 1 is an elevational view of a gyroscope with the novel valve attached to the rotor chamber.

Referring now more particularly to the drawings wherein like numerals identify like parts throughout the several views, and more particularly to FIG. 1, there is shown a gyroscope 10 having gimbals 11 and a rotor (not shown) encased in an evacuated rotor chamber 13. The rotor (not shown) pivots about an axle attached at a plate 15 to the walls of the rotor chamber. The rotor chamber is evacuated through a valve 20 having a quick-connect adapter 21 to which an evacuation hose (not shown) may be removably attached. Cam lever 37 is used to open and close valve 20 and is shown in the closed position.

Figure 2:
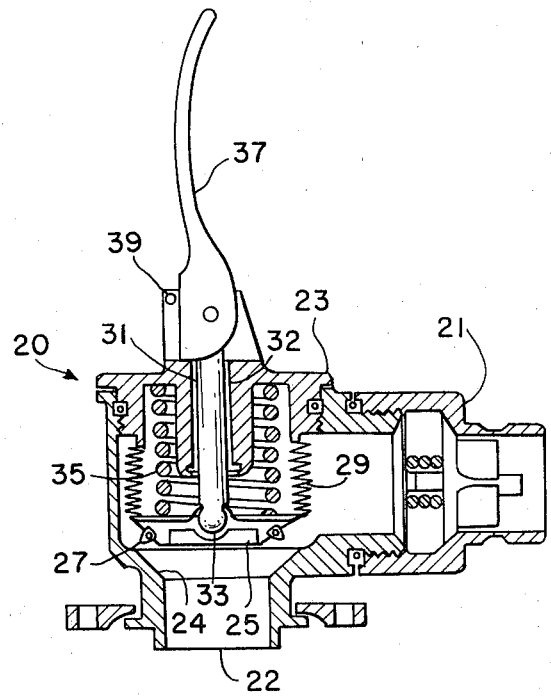
FIG. 2 is an elevational view partially in section of the valve in the fully opened position.

The novel valve 20 is shown in detail in FIG. 2. A port 22 in a valve housing 23, allows access into an evacuation chamber. With the valve 20 in the open position as shown, an evacuation hose (not shown) may be connected to the quick-connect adapter 21 for evacuation of the chamber. A tapered, cylindrical valve seat 24 is built to receive a valve body 25. Valve body 25 is grooved about its circumference to receive an O-ring 27 to provide a better valve seal. A bellows 29 connected to housing 23 and valve body 25 serves to seal off the seating mechanism from any contact with fluid flowing through the valve and also serves to bias valve body 25 to the closed position. A valve stem 31 moves within a self-lubricating bushing 32 and is connected to valve body 25 by a ball joint 33. A spring 35 biases valve body 25 to the closed position. Cam lever 37 moves valve body 25 closing and opening the valve as it is lowered and raised. A mechanical stop 39 insures that the cam lever 37 will be lowered in the proper direction for closing valve 20.

OPERATION

The operation of the present invention is now believed to be apparent. The vacuum hose (not shown) is attached to the quick-connect adapter 21 and cam lever 37 is raised to the position shown in FIG. 2. After the pressure in the evacuation chamber has been lowered to the desired value, cam lever 37 is lowered and the vacuum hose removed.

As cam lever 37 is placed in a lowered position, valve stem 31 moves valve body 25 toward contact with the valve seat 24. Valve body 25, being free to swivel about ball joint 33, automatically alines itself to fit properly within the valve seat 24. Once valve body 25 is seated, O-ring 27 provides an excellent seal. Valve body 25 is held in position by the spring tension of spring 35 and bellows 29.

Bellows 29 separates the seating apparatus from any contact with the fluid flowing through the valve 20. This relieves the requirement for packing about the valve stem making valve 20 essentially maintenance-free. Lifting cam lever 37 reverses the process, raising valve stem 31, valve body 25 and opening the valve. Cam lever stop 39 prevents over-center movement of cam lever 37 and prevents any movement of cam lever 37 which would not result in contact with the cam surface (not shown). Thus, it is seen that a quick reaction valve of simple design and construction providing a positive seal on an evacuation chamber having pressures on the order of 5 microns has been developed which requires no maintenance and which permits quick connection and disconnection of an evacuation hose for evacuation or reevacuation of the chamber.

Although the invention has been described and illustrated in detail in a specific embodiment thereof, it is to be understood that this description is by way of illustration only and is not to be taken as limiting on the applicant's invention. Obviously, there are many modifications and variations of the present invention possible in the light of the above teachings. Almost any material having the requisite strength and resistance to deterioration may be used in construction of the valve.

What is claimed as new and desired to be secured by Letters Patent of the United States is:

1. A valve for use in an evacuation system comprising:
    a housing for channeling the flow of a liquid;
    a valve seat formed in said housing for receiving a valve member;
    a valve member having a valve stem operative in a guide aperture formed in said housing;
    a ball and socket joint connecting said valve stem to said valve member whereby said valve member has sufficient freedom of movement for automatic alinement with said valve seat as said valve member is being seated;
    a self-lubricating bushing located in said guide aperture supporting and guiding said valve stem;
    a cam lever attached to said valve stem for selectively moving said valve member into and away from said valve seat;
    a spring engaging said housing and said valve member biasing said valve member toward said valve seat;
    an 0-ring fitted in a groove formed in said valve member for engaging said valve seat to seal said valve when in the seated position and
    a bellows attached to said valve member and to said housing;
    said bellows serving to seal valve-actuating structure from the fluid flowing through said housing and to bias said valve member to a seated position.

* * * * *